(12) United States Patent
Dance et al.

(10) Patent No.: US 7,776,418 B2
(45) Date of Patent: Aug. 17, 2010

(54) PACKAGE CLOSURE DEVICE

(76) Inventors: Carole Dance, 1204-39 Parliament Street, Toronto, Ontario (CA) M5A 4R2; Neal Dance, 1204-39 Parliament Street, Toronto, Ontario (CA) M5A 4R2

( * ) Notice: Subject to any disclaimer, the term of this patent is extended or adjusted under 35 U.S.C. 154(b) by 750 days.

(21) Appl. No.: 11/527,151

(22) Filed: Sep. 26, 2006

(65) Prior Publication Data
US 2008/0073244 A1 Mar. 27, 2008

(30) Foreign Application Priority Data
Sep. 14, 2006 (CA) ................... 2559672

(51) Int. Cl.
*B32B 9/00* (2006.01)
(52) U.S. Cl. .................. 428/40.1; 428/41.8; 428/42.2; 428/42.3
(58) Field of Classification Search ............... 428/40.1, 428/41.8, 42.2, 42.3
See application file for complete search history.

(56) References Cited

U.S. PATENT DOCUMENTS

| | | | |
|---|---|---|---|
| 4,008,851 A | 2/1977 | Hirsch | |
| 4,902,141 A * | 2/1990 | Linnewiel | .................. 383/61.1 |
| 4,911,563 A | 3/1990 | Ciani | |
| 5,387,453 A | 2/1995 | Cummisford | |
| 5,511,883 A | 4/1996 | Clark | |
| 5,582,889 A | 12/1996 | Pedrini | |
| 5,727,364 A | 3/1998 | Artieda | |
| 5,741,075 A | 4/1998 | Collins | |
| 5,824,380 A | 10/1998 | Hagen | |
| 5,855,434 A | 1/1999 | Hagen | |
| 6,517,243 B2 | 2/2003 | Huffer | |
| 2002/0023407 A1 | 2/2002 | Kellaway | |
| 2003/0044567 A1 | 3/2003 | Jevons | |

FOREIGN PATENT DOCUMENTS

DE 4314927 A1 * 11/1994

OTHER PUBLICATIONS

Abstract of DE 4314927 A1, see above.*

* cited by examiner

*Primary Examiner*—Victor S Chang
(74) *Attorney, Agent, or Firm*—The Webb Law Firm

(57) ABSTRACT

A package closure device comprising a flexible single-layer element having three sections. A first section configured to adhere substantially permanently to a first location on the package. A second section, attached to the first section, configured to releasably and reattachably attach to a second location on the package so as to close an opening of the package. A third section, attached to the second section, and configured to permit a user to release the second section by applying a force to the third section. A kit of multiple package closure devices detachably connected in series so as to be formable in a roll, with perforations or other detachable connectors between the closure devices.

19 Claims, 2 Drawing Sheets

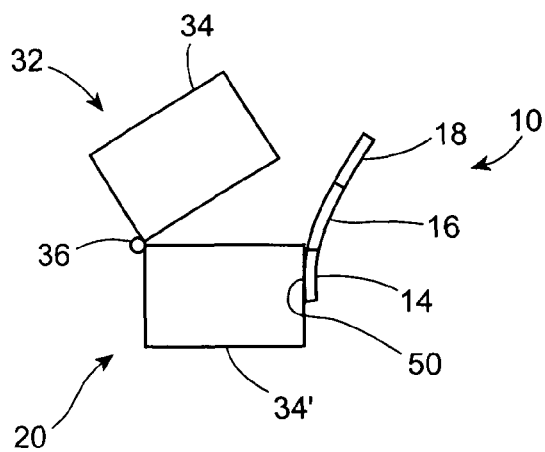
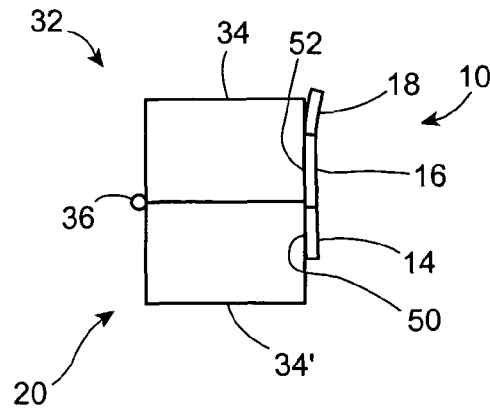
Figure 4a  Figure 4b
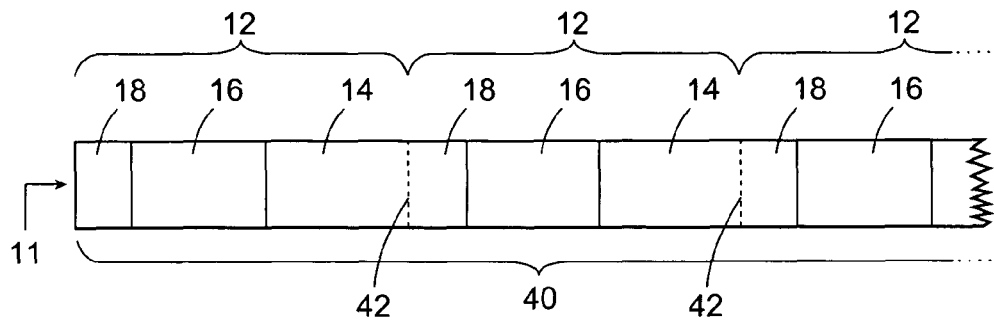
Figure 5
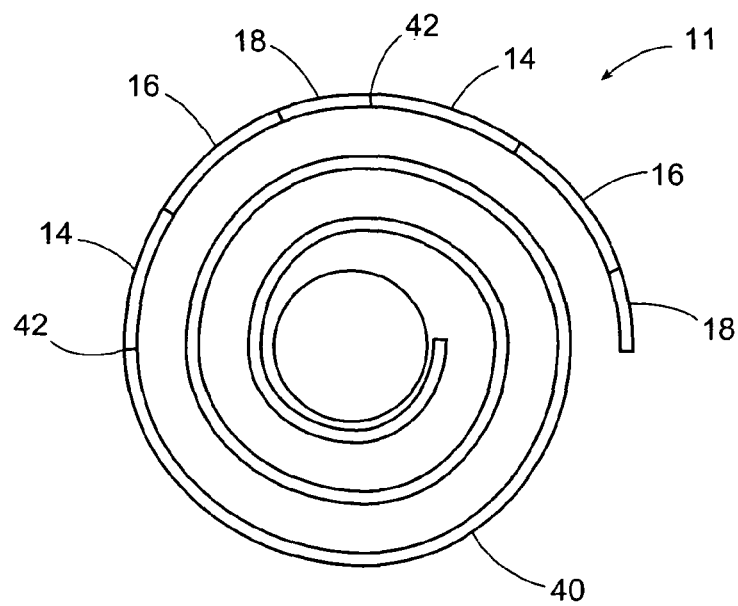
Figure 6

PACKAGE CLOSURE DEVICE

FIELD OF THE INVENTION

The invention relates to food or other packaging. More particularly, this invention relates to recloseable food or other packaging.

BACKGROUND OF THE INVENTION

Consumer products such as food and various household items are commonly sold in packages which are initially closed, and must be opened to access their contents. Most of the time, after a package is opened for the first time, only a portion of the content of the package is removed, and the remainder is left in the package to be accessed at another time. In between uses, it is usually desirable to close or seal the package to prevent spillage and/or to preserve the freshness of the content remaining in the package. However, many packages are not configured to provide a means for reclosure after they have been opened. This problem is common inter alia, in bag-type packaging.

With bags, a user may try to simply fold the open end of the bag in order to close the opening. However, this approach is generally not sufficient because of the "memory" of the material and its tendency to open by itself when stored on a shelf or in the refrigerator.

In an attempt to deal with this package reclosure problem, consumers have adopted a variety of improvised methods, such as wrapping the packages with rubber bands, applying common adhesive tape, or placing weighted objects on the packages to hold them closed. However, each of these improvised methods has a problem associated with it. For example, rubber bands need to be available in a variety of sizes to fit variously sized packages. Alternatively, larger rubber bands need to be twisted several times to fit smaller objects. Household tape such as masking tape or transparent Scotch® brand tape can be inconvenient to cut into appropriately sized-segments. Also, inconveniently, a new piece of tape is needed each time the package is reclosed. With some kinds of tape (e.g. masking tape), the tape may be too weak to hold the bag closed. Finally, a weighted object placed on the closed package often fails to form a good seal, and can too easily fall, or be jostled, off of the package.

One product that has been marketed to address the reclosure problem is a type of plastic clip with a wide mouth. This device however is somewhat bulky and accordingly inconvenient to store, particularly when several are kept handy for use with a multiple number of packages. Also, such a device is only suitable for closing bag-like packages, and cannot be used for carton or box containers.

A recloseable package is disclosed in U.S. Pat. No. 6,517,243 which teaches a recloseable bag with a built-in reusable closure. However, the bag is complex and expensive to manufacture. Moreover, the use of the closure limited to the bag to which it is attached. Thus, if food is purchased in a non-recloseable package, the food must be transferred to the recloseable bag to be stored.

Another recloseable bag is shown in U.S. Pat. No. 4,902,141 ("Linnewiel"). The closure of Linnewiel is attached to the bag at the time of manufacture (col. 4 lines 3-15). As shown in FIG. 5, the closure of Linnewiel is a bi-layer closure. Specifically, the flat section 1 bearing high-tack adhesive 1a is covered by tape section 2 bearing silicone 2a. Thus, in use, the closure of Linnewiel has two layers—flat section 1 and tape section 2. The problem with this bi-layer configuration is that it is susceptible to twisting, and other problems relating to the layers mistakenly sticking at incorrect locations.

Reusable package closures for affixation the side of a bag are taught in U.S. Pat. Nos. 4,911,563, 5,582,889, 5,824,380, 5,511,883, 5,855,434. These devices require multi-step processing for their manufacture, and are therefore expensive to make. In some cases, each tab or label is stored separately on strips of silicone paper or the like. This requires added packaging steps and material which further increases the costs of producing these devices.

SUMMARY OF THE INVENTION

Therefore, what is preferred is a package closure device which can preferably be easily dispensed and used, and applied in the home to a wide variety of different packages.

In one aspect of the invention, there is provided a package closure device comprising:
a flexible single-layer element, the element comprising three sections, the three sections comprising:
  a first section configured to adhere substantially permanently to a first location on the package;
  a second section, attached to the first section, configured to releasably and reattachably attach to a second location on the package so as to close an opening of the package;
  a third section, attached to the second section, and configured to permit a user to release the second section by applying a force to the third section.

In another aspect of the invention, there is provided a kit for dispensing package closure devices, the kit comprising:
a plurality of package closure devices detachably connected in series so as to be formable in a roll;
each package closure device comprising a flexible element, the flexible element comprising three sections, the three sections comprising a first section configured to adhere substantially permanently to a first location on the package; a second section, attached to the first section, configured to releasably and reattachably attach to a second location on the package so as to close an opening of the package; and a third section, attached to the second section, configured to permit a user to release the second section by applying a force to the third section;
each package closure device comprising a detachable connector for detachably connecting to an adjacent package closure device.

In another aspect of the invention, there is provided the use of the package closure device to close a package, preferably wherein the package is closed by applying to the package by hand a section of the closure device configured to adhere substantially permanently to the package.

In another aspect of the invention, there is provided a method of closing a package, the method comprising the steps of (1) detaching a package closure device from the kit; (2) positioning the detached package closure device on the package so as to close the package.

BRIEF DESCRIPTION OF THE DRAWINGS

Reference will now be made to the preferred embodiments of the present invention with reference, by way of example only, to the following drawings in which:

FIGS. 4a and 4b are side views showing the package closure device of FIG. 1 in use to releasably close an open container;

FIG. 5 is a top view of a package closure device as a plurality of segments joined together in the form of a strip; and FIG. 6 is a side view of the strip of FIG. 5 in the form of a roll.

DETAILED DESCRIPTION OF THE PREFERRED EMBODIMENTS

The present invention is described in more detail with reference to exemplary embodiments thereof as shown in the appended drawings. While the preferred embodiments of present invention are described below. It should be understood that the present invention is not limited to these preferred embodiments or to the alternate example embodiments described herein. Those of ordinary skill in the art having access to the teachings herein will recognize additional implementations, modifications, and embodiments which are within the scope of the present invention as disclosed and claimed herein. In the figures, like elements are given like reference numbers.

Figure 1:
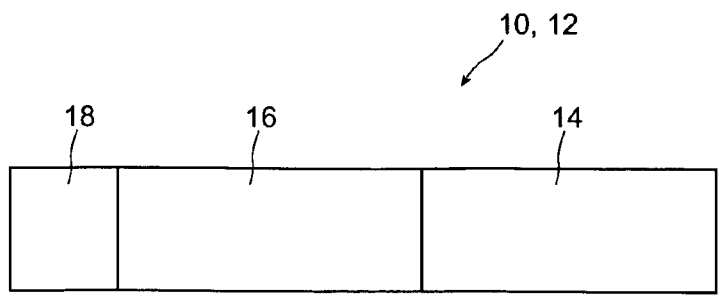
FIG. 1 is a top view of a package closure device in the form of a segment according to an embodiment of the present invention.

Referring now to FIG. 1, there is shown a package closure device 10 according to an embodiment of the present invention. The package closure device 10 is preferably, but not necessarily, comprised of a thin, flexible strip of material. For example, the package closure device 10 may be made of a film of plastic material, such as polypropylene, polyvinyl chloride or the like. Although less preferred, another material for the package closure device 10 may be a thin strip of paper. Other materials may also be used. What is preferred is that the device 10 comprise a flexible, single-layer element.

The package closure device 10 shown in FIG. 1 comprises a flexible segment 12 having three sections 14, 16, 18. The first section 14 is configured to adhere substantially permanently to a first location on a package 20. Thus, first section 14 is preferably provided with a substantially permanent, high-tack adhesive configured to adhere the first section substantially permanently to the first location. The second section 16 is preferably configured to releasably and reattachably attach to a second location on the package 20 so a to close an opening of the package 20. Thus, the second section 16 is preferably provided with a releasable and reattachable low-tack adhesive configured to releasably adhere the second section to the second location. The third section 18 is free of any adhesive. Preferably, the segment 12 is a substantially flat having two opposite sides, one bearing the adhesive, and the other configured to face away from the package 32 in use.

As shown in FIG. 1 the three sections 14, 16, 18 of the flexible segment 12 are preferably sequentially arranged such that the first section 14 is adjacent to the second section 16, which in turn is adjacent to the third section 18. Accordingly, the second section 16 is located between the first section 14 and the third section 18. Although in a preferred embodiment, the three sections 14, 16, 18 are contiguous as shown in FIG. 1, it is contemplated that they may be attached to one another but spaced from one another by adhesive-free sections, or sections having other characteristics, so long as they do not interfere with the functionality of the package closure device 10. What is important is that the second section 16 is positioned between the first section 14 and the third section 18.

The first section 14 and the second section 16 are preferredly configured to be of the same or similar length, and substantially longer than the third section 18. For example, the relative lengths for the first, second, and third sections 14, 16, 18 may be respectively, 5, 5, and 2 cm for a strip having a uniform width of 19 mm. For a wider strip, for example, having a uniform width of 48 mm, the relative lengths for the first, second, and third sections 14, 16, 18 may be respectively 8, 6, and 2 cm. However, it will be appreciated that the present invention is not limited to these dimensions, which are provided by way of example only.

It will be appreciated that these relative lengths are preferred to enhance the functionality of closure 10. Specifically, first section 14 functions to adhere substantially permanently to the package 20. This adherence is stronger as the amount of surface area of the package 20 covered by the first section 14 is increased. The second section 16 adheres to a second location to close the package. The distance between the first and second location will vary from one package to the next, depending, inter alia, on the size, flexibility and shape of the package 20. Thus, the device 10 can function effectively on a wider variety of packages if section 16 is relatively long.

Third section 18 is attached to second section 16, and third section 18 is configured to permit a user to release the second section 16 by applying a force to third section 18 (e.g. by pulling section 18 to cause section 16 to release from package 20).

Having described aspects of the preferred package closure device 10 according to the present invention, the uses of the device 10 to reclose various types of packages will now be appreciated by those skilled in the art.

Figure 2A:
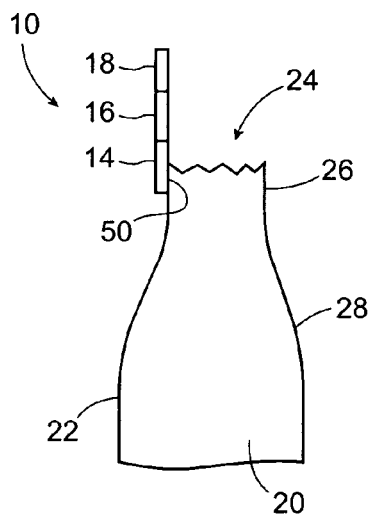
FIGS. 2a, 2b, and 2c are side views showing the package closure device of FIG. 1 in use to releasably close an open bag.
Figure 2B:
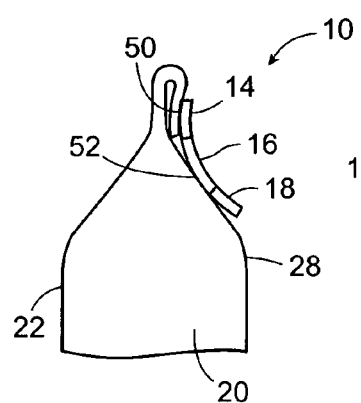
Figure 2C:
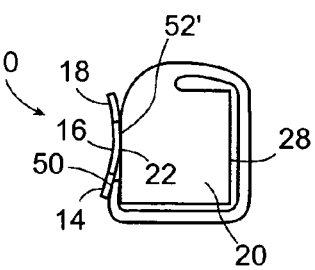

For example, FIGS. 2a, 2b and 2c show an example of one way the package closure device 10 may be used to close a package such as a potato chip bag 20 which has been previously opened. In FIG. 2a the package closure device 10 is shown with the first section 14 permanently attached to an outside surface of the front panel 22 of the bag 20, adjacent to opening 24, at a first location 50. The package closure device 10 is oriented so that the second and third sections 16, 18 point upwardly, in the direction of the opening 24. Next, the top portion 26 of the bag 20 is folded over and the second section 16 is pressed to the outside surface of either the front panel 22 (FIG. 2b) at a second location 52 or wrapped around and secured to the outside surface of the rear panel 28 (FIG. 2c) at a second location 52. In this way, the bag 20 remains closed and unwrapping is prevented. With the bag 20 closed in this manner, the third section 18 of the package closure device 10 preferably remains easily accessible since it preferably does not adhere to the surface of the bag 20. When it is desired to re-open the bag 20 to access its content, the user grasps the third section 18 and pulls on it to release the second section 16 from the surface of the front or rear panel 22,28 of the bag 20, as the case may be, thereby permitting the bag 20 to be reopened. The bag 20 can be repeatedly and easily re-opened and closed by releasing and reattaching section 16 with each closing providing a secure and effective seal. Once the content of the bag 20 is spent, the bag 20 may be discarded along with the package closure device 10.

Figure 3A:
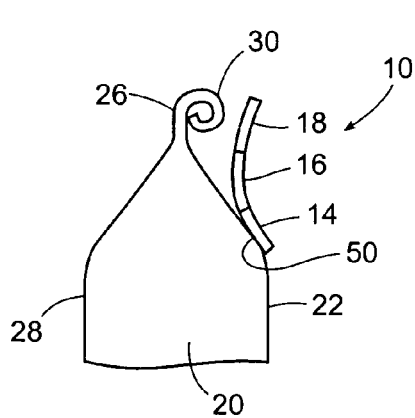
FIGS. 3a and 3b are side views showing the package closure device of FIG. 1 in another use to releasably close an open bag.
Figure 3B:
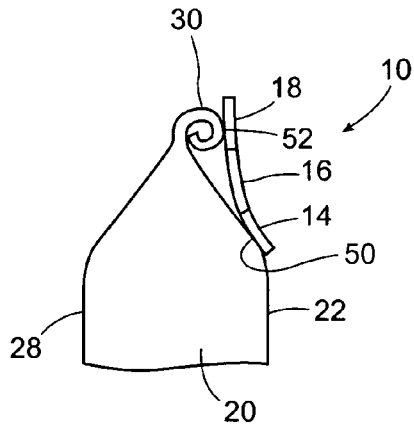

FIGS. 3a and 3b show an alternate use of the package closure device 10 to close a package such as a potato chip bag 20 which has been previously opened. As shown in FIG. 3a, the top portion 26 of the bag 20 is flattened and folded over at least twice on to the front panel 22 of the bag 28. The user then permanently attaches the first section 14 of the package closure device 10 to outside surface of the front panel 22 of the bag 20 at a first location 50 below the folded top portion 30, such that the second and third sections 16, 18 extend upwardly towards the folded top portion 30. This may, for example, be done by applying the first section 14 to the bag 20 by hand. Next, as shown in FIG. 3b, the second section 16 is pressed to the surface of the folded top portion 30 at a second location 52 (which is the outside surface of the rear panel 28 of the bag 20) to prevent the folded top portion 30 from unfolding. When the bag 20 is closed in this fashion, the third section 18 remains easily accessible since it does not adhere to the surface of the bag 20. When it is desired to re-open the bag 20 to access its contents, the user grasps the third section 18 and pulls on it to release the second section 16 from the surface of the folded top portion 30 at the second location 52, thereby permitting the bag 20 to be re-opened. The bag 20 can be repeatedly and easily re-opened and closed by releasing and reattaching section 16, with each closure providing a secure and effective seal. Once the contents of the bag 20 are spent, it may be discarded along with the package closure device 10.

Alternatively, the first section 14 of the package closure device 10 may be permanently attached to the surface of the folded top portion 30, such that the second and third sections 16,18 point downwardly from the folded top portion 30 of the bag 20 towards the front panel 22 of the bag 20. Next, the second section 16 may be pressed to the surface of the front panel 22 of the bag 20 to prevent the folded top portion 30 from unfolding. When the bag 20 is closed in this fashion, the third section 18 remains easily accessible since it does not adhere to the surface of the bag 20. When it is desired to re-open the bag 20 to access its content, the user grasps the third section 18 and pulls on it to release the second section 16 from the surface of the front panel 22 of the bag 20, thereby permitting the bag 20 to be re-opened. The bag 20 can be repeatedly and easily re-opened and closed in this manner, with each closure providing a secure and effective seal. Once the content of the bag 20 is spent, it may be discarded along with the package closure device 10.

FIGS. 4a and 4b show an example of the package closure device 10 being used to close a package such as a package 20 in the form of container 32 having two halves 34,34' secured together by a hinge 36. As shown in FIG. 4a, a user permanently attaches the first section 14 of the package closure device 10 to the outside of the container 32 at a first location 50, on one side of the opening 24, and releasably attaches the second section 16 to the outside surface of the container 32 on the other side of the opening 24 to keep the opening closed (see FIG. 4b). When the container 32 is closed in this fashion, the third section 18 remains easily accessible since it does not adhere to the surface of the container 32. When it is desired to re-open the container 32 to access its content, the user grasps the third section 18 and pulls on it to release the second section 16 from the surface of the container 32, thereby permitting the container 32 to be re-opened. The container 32 can be repeatedly and easily re-opened and closed by releasing and reattaching the section 16, with each closure providing a secure and effective seal. Once the content of the container 32 is spent, it may be discarded along with the package closure device 10.

Although the package is illustrated as a bag 20 or container 32, other packages such as boxes, cartons, envelopes, pouches, etc., are encompassed by the present invention.

FIGS. 5 and 6 show a preferred kit 11 for dispensing devices 10. The kit 11 preferably comprises a plurality of the devices 10 detachably connected in series so as to be formable in a roll 40. It will be appreciated that, while the kit 11 preferably employs the preferred devices 10 described above, package closure devices having different features from preferred devices 10 may be used. What is important is that the kit 11 comprise a plurality of package closure devices connected in series.

For user convenience, the three sections 14, 16, 18 may be marked with visual indicators, such as colours, symbols, and/or alphabetic or numeric characters to indicate the identity of the corresponding section.

Preferably, each device 10 of the kit 11 includes a detachable connector for detachably connecting to an adjacent package closure device 10. Most preferably, the detachable connector takes the form of a tear-away portion 42 provided between devices 10, to facilitate the tearing away of individual segments 12 from the roll 40. The tear-away portion 42 may comprise a perforated portion, or some other feature that facilitates tearing of a device 10 from an adjacent device 10. The tear-away portion 42 may include one or more visual indicators to indicate the position of tear-away portion 42. As will be appreciated by those skilled in the art, the visual indicator may be a distinctive colour, an alphabetic character, a numeric character, a symbol, or the like.

Optionally, though less preferred, the tear-away portion 42 may simply comprise a visual indicator indicating the point at which adjacent devices 10 are joined. In this less preferred embodiment, there need not be any perforations or other features to reduce the force needed to tear the devices 10 from one another. It will be appreciated that this embodiment is more likely to be used when the roll 40 is placed in a dispenser (not shown) having a cutting tool to assist in tearing. However, it will be appreciated that the portion 42 preferably includes perforations or other features to reduce the force needed to tear the devices 10 from one another.

The convenience and benefits of the present invention relative to conventional adhesive tape can be readily appreciated. In conventional tape there is no non-adhesive portion, so both ends of the tape adhere tightly to the package, make reclosing the package with the same tape difficult. Accordingly, removing either end is difficult, and often requires the user to dig a fingernail under the tape, which is awkward, messy, and often tears the tape. As a result, with bags, users often find it more convenient to pull at the tape in the more accessible "air gap" located between the rolled top and the lower portion of the bag. Sometimes however this method causes the tape to twist on itself, so that it cannot be re-applied and needs to be thrown away. Also, conventional tape is difficult to use with carton packages, since in those cases the entire length of tape is in contact with the package, and there is no convenient air gap.

Preferably, the device 10 is not attached to the package 32 at the point of manufacture, as this limits the use of the device 10 to a particular bag. Rather, the device 10 is preferably configured to be permanently attached to the package 32 after it has been opened, to permit reclosing.

It will be appreciated by those skilled in the art that device 10 therefore preferably comprises a single layer element such as segment 12. It has been found that, when manipulated by human hands, multi-layer or bi-layer elements are significantly more likely to twist or fold so that different portions of the element stick to each other in a way that renders the closure unusable. By contrast, the use of a single-layer reduces this problem. Thus, the device 10 is less likely to be ruined as the user applies the first section 14 to the package 32 by hand.

It will be appreciated that it is preferred for the devices 10 to be provided as part of kit 11, rather than as separate pieces. The kit 11, in the form of a roll 40, provides an efficient way of storing and dispensing devices 10, without individual devices 10 becoming lost or separated. By contrast, individual devices 10 not connected to one another would need to be stored in a bag or box, which would be susceptible to spilling, and which takes up extra space. Also, it will be appreciated that because the device 10 has adhesive on it, it may be necessary to place a backing layer on the device 10 to protect the adhesive before use. However, when the devices 10 are in roll 40, the devices 10 located in the roll 40 an themselves act as the backing layer for other devices 10 located further toward the outside of the roll 40. In other words, in a roll 40, each device 10 acts as a backing to one or more other devices 10 because, in the roll 40, the adhesive side of one device 10 will bear against the non-adhesive side of another device 10. This obviates the need for a separate backing layer for each device 10, thus saving material and space.

While reference has been made to various preferred embodiments of the invention other variations are comprehended by the broad scope of the appended claims. Some of these have been discussed in detail in this specification and others will be apparent to those skilled in the art. All such variations and alterations are comprehended by this specification are intended to be covered, without limitation.

The embodiments of the invention in which an exclusive property or privilege is claimed are defined as follows:

1. A package closure device comprising:
   a single, flexible, planar element, having opposing first and second sides, the element comprising three contiguous section, the three sections comprising:
   a first section configured to adhere a portion of the first side of the element substantially permanently and directly to a first location on the package;
   a second section, attached to the first section, configured to releasably, reattachably and directly attach a portion of the first side of the element to a second location on the package so as to close an opening of the package;
   a third section, attached to the second section, and configured to permit a user to release the second section by applying a force to the third section.

2. A package closure device as claimed in claim 1, wherein the first section includes substantially permanent adhesive configured to adhere the first section substantially permanently to the first location, and the second section includes releasable and reattachable adhesive configured to releasably adhere the second section to the second location.

3. A package closure device as claimed in claim 1, comprising a plurality of said flexible elements arranged contiguously in the form of a strip.

4. A package closure device as claimed in claim 1, wherein at least one of said first, second and third sections includes a visual indicator to indicate the identity of the corresponding section.

5. A package closure device as claimed in claim 4, wherein said visual indicator is a colour.

6. A package closure device as claimed in claim 4, wherein said visual indicator is a symbol.

7. A kit for dispensing package closure devices, the kit comprising:
   a plurality of package closure devices detachably connected in series so as to be formable in a roll;
   each package closure device comprising a single, flexible, planar element, having opposing first and second sides, the flexible element comprising three contiguous section, the three sections comprising a first section configured to adhere a portion of the first side of the element substantially permanently and directly to a first location on the package; a second section, attached to the first section, configured to reasonably, reattachably, and directly attach a portion of the first side of the element to a second location on the package so as to close an opening of the package; and a third section, attached to the second section, configured to permit a user to release the second section by applying a force to the third section;
   each package closure device comprising a detachable connector for detachably connecting to an adjacent package closure device.

8. A kit as claimed in claim 7, wherein said detachable connection means comprises a tear-away portion positioned between adjacent package closure devices and configured to facilitate the tearing away of one package closure device from an adjacent package closure device.

9. A kit as claimed in claim 8, wherein said tear-away portion comprises a perforated portion.

10. A kit as claimed in claim 8, wherein said tear-away portion includes a visual indicator to indicate the position of the tear-away portion.

11. A kit as claimed in claim 10, wherein said visual indicator comprises a colour.

12. A kit as claimed in claim 10, wherein said visual indicator comprises a symbol.

13. A kit as claimed in claim 7, wherein the plurality of package closure devices is formed in a roll.

14. Use of the package closure device of claim 1 to close a package.

15. The use as claimed in claim 14, wherein the package is closed by applying to the package by hand a section of the closure device configured to adhere substantially permanently to the package.

16. A method of closing a package, the method comprising the steps of (1) detaching a package closure device from the kit of claim 7; (2) positioning the detached package closure device on the package so as to close the package.

17. A method of opening the package closed by the method of claim 16, the method comprising the step of applying a force to the third section of the detached package closure device to release the second section of the detached package closure device.

18. A method as claimed in claim 17, the method comprising the step of pulling said third section by hand.

19. A package closure device as claimed in claim 1, wherein the first side does not contact the second side.

* * * * *

UNITED STATES PATENT AND TRADEMARK OFFICE
CERTIFICATE OF CORRECTION

PATENT NO. : 7,776,418 B2   Page 1 of 1
APPLICATION NO. : 11/527151
DATED : August 17, 2010
INVENTOR(S) : Dance et al.

It is certified that error appears in the above-identified patent and that said Letters Patent is hereby corrected as shown below:

Column 7, Line 28, Claim 1, "section," should read -- sections, --

Column 8, Line 12, Claim 7, "reasonably, reattachably" should read -- releasably, reattachably --

Signed and Sealed this

Thirtieth Day of November, 2010

David J. Kappos
*Director of the United States Patent and Trademark Office*